US012804020B2

(12) United States Patent
Li et al.

(10) Patent No.: US 12,804,020 B2
(45) Date of Patent: Nov. 17, 2026

(54) VEHICLE STREAMING SYSTEM INCLUDING ONE OR MORE PERIPHERAL CAMERAS

(71) Applicant: GM Global Technology Operations LLC, Detroit, MI (US)

(72) Inventors: Chuan Li, Troy, MI (US); Fan Bai, Ann Arbor, MI (US); Jinzhu Chen, Troy, MI (US); Esther Anderson, Canton, MI (US); Jace C. Stokes, Highland, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 112 days.

(21) Appl. No.: 18/904,615

(22) Filed: Oct. 2, 2024

(65) Prior Publication Data

US 2026/0095491 A1 Apr. 2, 2026

(51) Int. Cl.

| | |
|---|---|
| ***H04N 19/146*** | (2014.01) |
| ***H04L 65/1089*** | (2022.01) |
| ***H04L 65/70*** | (2022.01) |
| ***H04L 65/80*** | (2022.01) |
| ***H04N 19/172*** | (2014.01) |
| ***H04N 19/40*** | (2014.01) |
| ***H04R 3/00*** | (2006.01) |

(52) U.S. Cl.

CPC .......... *H04L 65/1089* (2013.01); *H04L 65/70* (2022.05); *H04L 65/80* (2013.01); *H04N 19/146* (2014.11); *H04N 19/172* (2014.11); *H04N 19/40* (2014.11); *H04R 3/005* (2013.01); *H04R 2499/13* (2013.01)

(58) Field of Classification Search

CPC ... H04L 65/1089; H04N 19/146; H04N 19/40

See application file for complete search history.

(56) References Cited

U.S. PATENT DOCUMENTS

| | | | | |
|---|---|---|---|---|
| 9,813,542 | B1 | 11/2017 | Shan et al. | |
| 2005/0073575 | A1* | 4/2005 | Thacher | H04N 21/4143 348/E7.083 |
| 2021/0051298 | A1* | 2/2021 | Atkins | H04N 7/147 |
| 2024/0259459 | A1* | 8/2024 | Springer | G06F 3/1454 |
| 2024/0414284 | A1* | 12/2024 | Hanson | G06V 10/25 |

* cited by examiner

*Primary Examiner* — Amal S Zenati

(74) *Attorney, Agent, or Firm* — Vivacqua Crane, PLLC

(57) ABSTRACT

A vehicle streaming system including one or more peripheral cameras that capture streaming live video that is transmitted over a network to one or more media servers includes one or more controllers in wireless communication with the one or more peripheral cameras and one or more media servers by the network. The one or more controllers each include one or more processors that execute instructions to select a most recent video frame of the streaming live video for transmittal over the network to the one or more media servers. The one or more media servers share the streaming live video with one or more client computers associated with other participants of the existing video conferencing session.

20 Claims, 5 Drawing Sheets

VEHICLE STREAMING SYSTEM INCLUDING ONE OR MORE PERIPHERAL CAMERAS

INTRODUCTION

The present disclosure relates to a vehicle streaming system that includes one or more peripheral cameras that capture streaming live video that is transmitted over a network and shared with one or more client computers associated with other participants of an existing video conferencing session.

Many vehicles include various types of perception sensors such as, for example, radar, LiDAR, and in-vehicle cameras. In-vehicle cameras refer to cameras that are integrated with the vehicle's systems and subsystems. The vehicle may also connect to a peripheral camera, which is referred to as a bring your own device (BYOD) camera, as well. The peripheral camera may be part of an occupant's mobile device, such as a smartphone or tablet computer.

In some situations, an occupant may prefer to utilize a peripheral camera instead of the in-vehicle camera to perform certain tasks. For example, because of their mounting position within the interior cabin of a vehicle, in-vehicle cameras capture video data representing the vehicle's occupants based on a top-down view, which is not ideal for video conferencing or other types of streaming media applications. In an effort to address the issues experienced with the top-down view, some vehicles may provide an in-vehicle camera that is mounted to the top of the vehicle's dashboard instead. However, in-vehicle cameras mounted to the top of the dashboard are not positioned to capture video data representative of the vehicle's second or third row occupants.

When the vehicle utilizes a peripheral camera for a video conferencing application, the canonical name corresponding to the peripheral camera is visible to other video conferencing participants. However, it is to be appreciated that the canonical name corresponding to the peripheral camera does not match the canonical name corresponding to the in-vehicle application. Thus, the other video conference participants are able to see that the occupant is using a peripheral device during the video conference because of the different canonical name associated with the peripheral camera, which is displayed during the video conferencing session. This may create confusion with the other video conferencing participants who do not recognize or may not trust the canonical name associated with the peripheral camera. As a result, another video conferencing participant may disregard or disconnect the peripheral camera from the video conferencing session.

Thus, while current systems achieve their intended purpose, there is a need in the art for an improved approach to seamlessly integrate a peripheral camera with a vehicle streaming system.

SUMMARY

According to several aspects, a vehicle streaming system including one or more peripheral cameras that capture streaming live video that is transmitted over a network to one or more media servers is disclosed. The vehicle streaming system includes one or more controllers in wireless communication with the one or more peripheral cameras and one or more media servers by the network. The one or more controllers each include one or more processors that execute instructions to determine the one or more peripheral cameras are actively capturing live video during an existing video conferencing session and receive a camera capture signal indicative of an occupant of the vehicle attempting to share the streaming live video captured by the one or more peripheral cameras during the existing video conferencing session. In response to determining the one or more peripheral cameras are actively capturing live video and receiving the camera capture signal, the one or more controllers analyze the streaming live video captured by the one or more peripheral cameras to determine one or more quality metrics of the streaming live video. The one or more controllers compare the one or more quality metrics of the streaming live video with one or more quality metric goals determined by the one or more media servers. In response to determining the one or more quality metrics of the streaming live video meets the one or more quality metric goals, the one or more controllers decode the streaming live video, and in response to receiving a raw frame event signal, select a most recent video frame of the streaming live video for transmittal over the network to the one or more media servers. The one or more media servers share the streaming live video with one or more client computers associated with other participants of the existing video conferencing session.

In another aspect, the one or more controllers execute instructions to in response to determining the one or more quality metrics of the streaming live video does not meet the one or more quality metric goals, perform video transcoding upon the streaming live video captured by the one or more peripheral cameras to adjust one or more streaming parameters of the streaming live video to meet the one or more quality metric goals.

In yet another aspect, the one or more streaming parameters of the streaming live video include one or more of the following: resolution, frame rate, a number of sub-streams, a number of temporal layers, and a determination when scalable video coding techniques are activated.

In an aspect, the one or more controllers execute instructions to synchronize a most recent video frame of the streaming live video with local live audio captured by one or more in-vehicle microphones.

In another aspect, synchronizing the most recent video frame of the streaming live video with local live audio captured by one or more in-vehicle microphones includes determining an audio delay compensation value between a streaming live audio captured by a camera microphone and the local live audio captured by the one or more in-vehicle microphones of the vehicle.

In yet another aspect, the audio delay compensation value is determined by:

$$\text{argmax}_k R_{xy}[k] = \sum_{m=-\infty}^{\infty} x[m]y[m-k], \text{ where } \tau_1 = \frac{k}{\text{audio sampling rate}}$$

where $\tau_1$ represents the audio delay compensation value, x represents audio signals captured by the one or more in-vehicle microphones, y represents audio signals captured by the camera microphone, m and k both represent indices for the audio signals x captured by the one or more in-vehicle microphones and the audio signals y captured by the camera microphone, and $R_{xy}[k]$ represents a total sum of products of a signal from the audio signals captured by the one or more in-vehicle microphones x and a signal from the audio signals captured by the camera microphone y that is k index behind.

In an aspect, synchronizing the most recent video frame of the streaming live video with local live audio captured by one or more in-vehicle microphones includes determining a total delay compensation value that represents a delay between the local live audio captured by the one or more in-vehicle microphones and the streaming live video captured by the one or more peripheral cameras based on the audio delay compensation value and a wireless delay compensation value, and synchronizing the streaming live video captured by the one or more peripheral camera and the local live audio captured by the one or more in-vehicle microphones together based on the total delay compensation value.

In another aspect, the wireless delay compensation value represents a delay between the streaming live video captured by the one or more peripheral cameras and the streaming live audio captured by the camera microphone.

In yet another aspect, the total delay compensation value is the sum of the audio delay compensation value and the wireless delay compensation value.

In an aspect, the one or more quality metrics of the streaming live video include one or more of the following: bitrate, resolution, and frame rate.

In another aspect, the one or more quality metric goals are based on a media data rate required by the one or more media servers for the existing video conferencing session.

In yet another aspect, the raw frame event signal is indicative of the one or more client computers generating a request for the streaming live video.

In another aspect, a vehicle streaming system including one or more in-vehicle microphones and one or more peripheral cameras that capture streaming live video that is transmitted over a network to one or more media servers is disclosed. The vehicle streaming system includes one or more controllers in wireless communication with the one or more peripheral cameras, the one or more in-vehicle microphones, and one or more media servers by the network. The one or more controllers each include one or more processors that execute instructions to receive a camera capture signal indicative of an occupant of the vehicle attempting to share the streaming live video captured by the one or more peripheral cameras during an existing video conferencing session. In response to receiving the camera capture signal, the one or more controllers instruct the one or more peripheral cameras to analyze the streaming live video to determine one or more quality metrics of the streaming live video, where the one or more peripheral cameras include one or more camera processors that compare the one or more quality metrics of the streaming live video with one or more quality metric goals determined by the one or more media servers. In response to the one or more camera processors determining one or more quality metrics of the streaming live video meets the one or more quality metric goals, the one or more controllers parse the streaming live video into compressed streaming live video and video metadata. The one or more controllers synchronize the compressed streaming live video with local live audio captured by the one or more in-vehicle microphones and select a most recent video frame of the compressed streaming live video for transmittal over the network to the one or more media servers. The one or more media servers share the streaming live video with one or more client computers associated with other participants of the existing video conferencing session.

In another aspect, the one or more controllers execute instructions to analyze the video metadata to determine one or more media characteristics of the streaming live video, determine local session description protocol (SDP) information based on the one or more media characteristics of the video metadata and SDP information received from the one or more media servers, and transmit the local SDP information back to the one or more media servers to establish a wireless connection between the one or more controllers and the one or more media servers.

In yet another aspect, the one or more media characteristics of the streaming live video include one or more of the following: video codecs, a presence of sub-streams, and a presence of temporal layers.

In an aspect, the one or more quality metrics of the streaming live video include one or more of the following: bitrate, resolution, and frame rate.

A vehicle streaming system including one or more in-vehicle microphones and one or more peripheral cameras that capture streaming live video that is transmitted over a network to one or more media servers. The vehicle streaming system includes one or more controllers in wireless communication with the one or more peripheral cameras, the one or more in-vehicle microphones, and one or more media servers by the network. The one or more controllers each include one or more processors that execute instructions to receive a camera capture signal indicative of an occupant of the vehicle attempting to share the streaming live video captured by the one or more peripheral cameras during an existing video conferencing session. In response to receiving the camera capture signal, the one or more controllers instruct the one or more peripheral cameras to analyze the streaming live video to determine one or more quality metrics of the streaming live video, where the one or more peripheral cameras include one or more camera processors that compare the one or more quality metrics of the streaming live video with one or more quality metric goals determined by the one or more media servers. In response to the one or more camera processors determining one or more quality metrics of the streaming live video meets the one or more quality metric goals, the one or more controllers parse the streaming live video into compressed streaming live video and video metadata. The one or more controllers perform RTP packetization upon the compressed streaming live video and synchronize the compressed streaming live video with local live audio captured by the one or more in-vehicle microphones, where the RTP packetization is performed prior to synchronization with the local live video. The one or more controllers select a most recent video frame of the compressed streaming live video for transmittal over the network to the one or more media servers, where the one or more media servers share the streaming live video with one or more client computers associated with other participants of the existing video conferencing session.

In another aspect, the one or more controllers are in electronic communication with a camera microphone that is part of the one or more peripheral cameras and one or more in-vehicle cameras.

In yet another aspect, the one or more controllers execute instructions to mix the compressed streaming live video with a streaming live audio captured by the camera microphone that is part of the one or more peripheral cameras, a local live audio captured by the one or more in-vehicle microphones, and local live video captured by the one or more in-vehicle cameras.

In an aspect, the one or more controllers execute instructions to revise a canonical name associated with the one or more peripheral cameras to match a canonical name associated with the one or more in-vehicle cameras.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
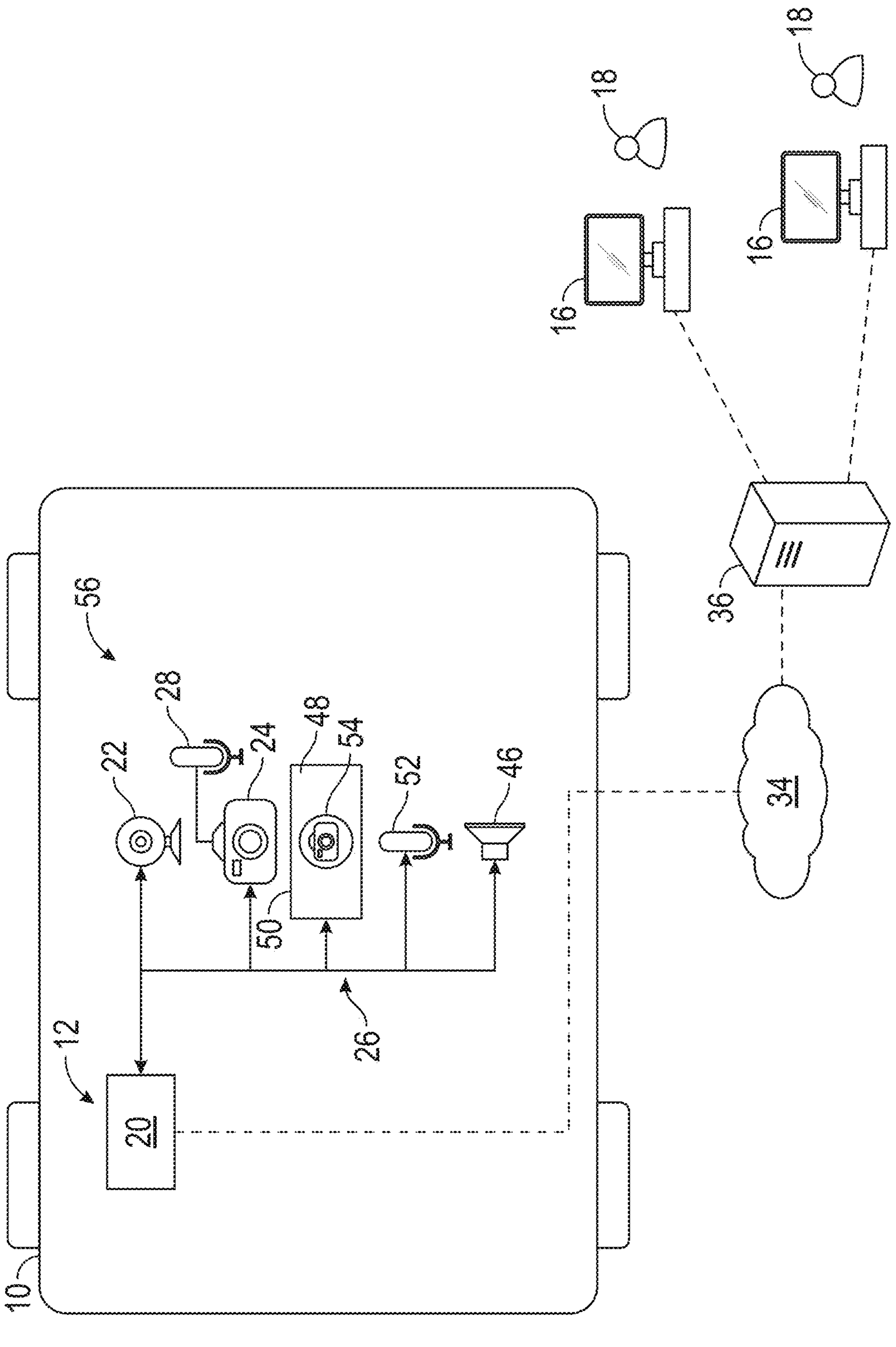
FIG. 1 illustrates a schematic diagram of a vehicle that includes the disclosed vehicle streaming system having one or more controllers in wireless communication with one or more peripheral cameras and one or more media servers over a network, according to an exemplary embodiment.

Referring to FIG. 1, a vehicle 10 including the disclosed vehicle streaming system 12 is illustrated. As explained below, the vehicle streaming system 12 includes one or more peripheral cameras 24 that capture streaming live video that is shared with one or more client computers 16 associated with other participants 18 of an existing video conferencing session. It is to be appreciated that the vehicle 10 may be any type of vehicle such as, but not limited to, a sedan, a truck, sport utility vehicle, van, or motor home. The vehicle streaming system 12 includes one or more controllers 20 in electronic communication with one or more in-vehicle cameras 22, the peripheral camera 24, and an infotainment system 26.

As seen in FIG. 1, the one or more peripheral cameras 24 include a camera microphone 28 for capturing streaming live audio. The one or more controllers 20 are also in wireless communication with a network 34 that connects the one or more controllers 20 that are part of the vehicle 10 with one or more media servers 36 that are located offsite from the vehicle 10. One or more media servers 36 may be connected to the one or more client computers 16 that are associated with other participants 18 of the existing video conferencing session. The existing video conferencing session includes streaming both audio and video content.

The one or more in-vehicle cameras 22 are part of the vehicle 10 and are normally connected to the one or more controllers 20 that are part of the vehicle streaming system 12 that captures streaming live video. The one or more peripheral cameras 24 are not normally connected to the one or more controllers 20 of the vehicle streaming system 12. Instead, the one or more peripheral cameras 24 represent a camera that is temporarily in wireless communication with the one or more controllers 20. In contrast, the one or more in-vehicle cameras 22 are part of the vehicle 10 and are normally connected to the one or more controllers 20. In one embodiment, the one or more peripheral cameras 24 may be part of a personal mobile device of an occupant of the vehicle 10. Some examples of personal mobile devices include, but are not limited to, a smartphone, a smartwatch, or a tablet computer. For example, in one embodiment, the one or more peripheral cameras 24 include a bring your own device (BYOD) camera. The one or more peripheral cameras 24 also includes one or more camera processors that execute instructions to analyze the streaming live video, which is described below.

The infotainment system 26 includes one or more displays 50, one or more in-vehicle microphones 52, and one or more speakers 46 that are in electronic communication with the one or more controllers 20. The one or more displays 50 show images upon a screen 48, the one or more in-vehicle microphones 52 that translate sound into electrical signals, and the one or more speakers 46 emit sound that is heard by the occupants of the vehicle 10. It is to be appreciated that the one or more in-vehicle microphones 52 are integrated with the vehicle 10, and are normally connected to the one or more controllers 20, unlike the camera microphone 28 of the one or more peripheral cameras 24.

The one or more controllers 20 instruct the one or more displays 50 to generate images representative of a camera capture button 54 upon the screen 48. Alternatively, the camera capture button 54 may be a physical switch or button that is located within an interior cabin 56 of the vehicle 10. It is to be appreciated that an occupant of the vehicle 10 selects the camera capture button 54 to share the streaming live video captured by the one or more peripheral cameras 24 during the existing video conferencing session supported by a streaming media service. The camera capture button 54 generates a camera capture signal 58 (shown in FIG. 2) in response to being selected by an occupant of the vehicle 10, where the camera capture signal 58 is transmitted to the one or more controllers 20. In other words, the camera capture signal 58 is indicative of an occupant of the vehicle 10 attempting to share the streaming live video captured by the one or more peripheral cameras 24 during the existing video conferencing session.

Figure 2:
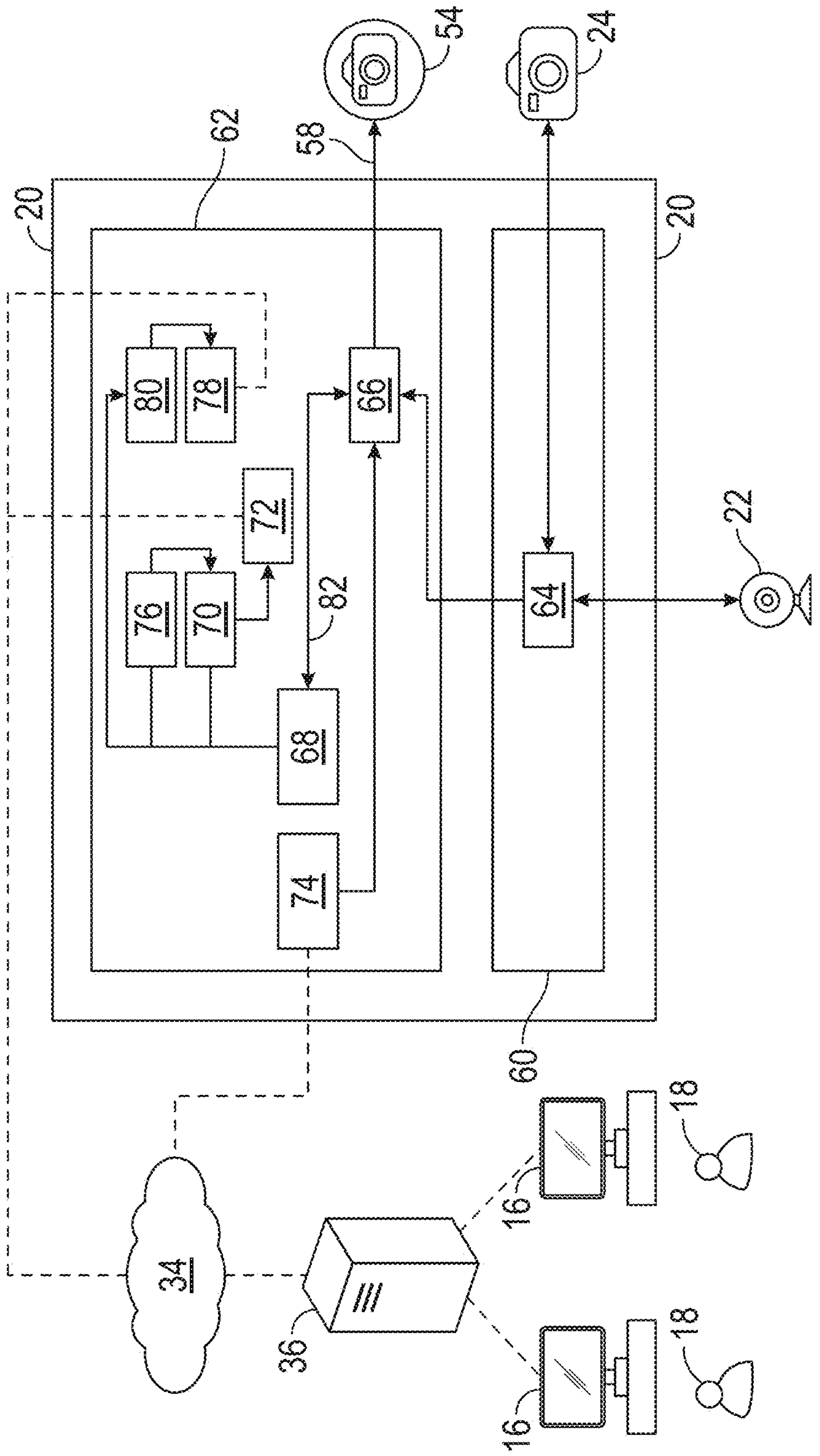
FIG. 2 is a block diagram illustrating the software architecture of the one or more controllers shown in FIG. 1, according to an exemplary embodiment.

FIG. 2 is a block diagram illustrating one embodiment of the software architecture of the one or more controllers 20 shown in FIG. 1. The one or more controllers 20 include a camera as a service application 60 and a video conferencing client application 62. The camera as a service application 60 includes a video forwarding module 64 that receives the streaming live video captured by the one or more peripheral cameras 24. In addition to the streaming live video captured by the one or more peripheral cameras 24, the video forwarding module 64 also receives the streaming live video from the one or more in-vehicle cameras 22 as well.

The video conferencing client application 62 of the one or more controllers 20 includes a video transcoding module 66, a camera media track module 68, an audio/video synchronization module 70, a peer-to-peer connection module 72, a quality control module 74, an audio/screen track module 76, a signaling controller 78, and a session description protocol (SDP) generator module 80. The video transcoding module 66 is in electronic communication with the video forwarding module 64 of the camera as a service application 60, the camera media track module 68, and the quality control module 74. As seen in FIG. 2, the video transcoding module 66 of the video conferencing client application 62 is also in electronic communication with and receives the camera capture signal 58 generated by the camera capture button 54.

The video transcoding module 66 of the video conferencing client application 62 monitors the video forwarding module 64 of the camera as a service application 60 for the streaming live video captured by the one or more peripheral cameras 24 during an existing video conferencing session supported by the streaming media service. In other words, the video transcoding module 66 of the video conferencing client application 62 first determines if the one or more peripheral cameras 24 are actively capturing live video during an existing video conferencing session.

In response to determining the video forwarding module 64 of the camera as a service application 60 is transmitting the streaming live video captured by the one or more peripheral cameras 24, and in response to receiving the camera capture signal 58 generated by the camera capture button 54, the video transcoding module 66 of the video conferencing client application 62 analyzes the streaming live video captured by the one or more peripheral cameras 24 to determine one or more quality metrics of the streaming live video. The one or more quality metrics are indicative of the quality of the streaming live video captured by the one or more peripheral cameras 24. Some examples of the one or more quality metrics of the streaming live video include, but are not limited to, bitrate, resolution, and frame rate.

As seen in FIG. 2, the quality control module 74 of the video conferencing client application 62 is in communication with the one or more media servers 36 by the network 34. The quality control module 74 of the video conferencing client application 62 receives one or more quality metric goals that are determined by the one or more media servers 36, where the one or more quality metric goals are based on a media data rate required by the one or more media servers 36 for the existing video conferencing session. It is to be appreciated that sometimes the media data rate required by the one or more media servers 36 may be less than the bitrate of the streaming live video captured by the one or more peripheral cameras 24, and therefore the bitrate of the streaming live video is slowed down for consumption by the one or more media servers 36. It is also to be appreciated that the one or more peripheral cameras 24 are not controlled by the one or more media servers 36 natively, since the one or more peripheral cameras 24 are external devices that are not part of the vehicle 10. Thus, as explained below, the vehicle streaming system 12 adjusts the quality of the streaming live video captured by the one or more peripheral cameras 24 to match the quality metric goals set forth by the one or more media servers 36.

The quality control module 74 of the video conferencing client application 62 transmits the one or more quality metric goals to the video transcoding module 66 of the video conferencing client application 62. The video transcoding module 66 of the video conferencing client application 62 compares the one or more quality metrics of the streaming live video with the one or more quality metric goals. In response to determining the one or more quality metrics of the streaming live video meets the one or more quality metric goals, the video transcoding module 66 of the video conferencing client application 62 merely decodes the streaming live video captured by the one or more peripheral cameras 24. The video transcoding module 66 then selects the most recent video frame of the streaming live video for processing and then transmittal over the network 34 to the one or more media servers 36 in response to receiving a raw frame event signal 82 from the camera media track module 68 of the video conferencing client application 62. The camera media track module 68 of the video conferencing client application 62 generates the raw frame event signal 82 in response to receiving a request for the streaming live video from one of the client computers 16 associated with the other participants 18 of the existing video conferencing session. That is, the raw frame event signal 82 is indicative of the client computers 16 generating a request for the streaming live video.

As explained below, the most recent video frame of the streaming live video is then synchronized with local live audio captured by the one or more in-vehicle microphones 52 by the audio/video synchronization module 70. The most recent video frame of the streaming live video is transmitted over the network 34 to the one or more media servers 36. The one or more media servers 36 share the streaming live video with the one or more client computers 16 that are associated with other participants 18 of the existing video conferencing session.

In contrast, in response to determining the one or more quality metrics of the streaming live video does not meet the one or more quality metric goals, the video transcoding module 66 of the video conferencing client application 62 performs video transcoding upon the streaming live video captured by the one or more peripheral cameras 24 to adjust one or more streaming parameters of the streaming live video to meet the one or more quality metric goals. Some examples of the one or more streaming parameters of the streaming live video include, but are not limited to, resolution, frame rate, a number of sub-streams, a number of temporal layers, and a determination when simulcasting or scalable video coding (SVC) techniques are activated in response to one of the client computers 16 associated with other participants 18 of the existing video conferencing session suffer from reduced network quality. For example, if the media data rate required by the one or more media servers 36 is less than the bitrate of the streaming live video captured by the one or more peripheral cameras 24, then the video transcoding module 66 would reduce the resolution and/or frame rate of the streaming live video to meet the media data rate required by the existing video conferencing session.

Once the one or more quality metric goals are met, the video transcoding module 66 then selects the most recent video frame of the streaming live video for transmittal over the network 34 to the one or more media servers 36 in response to receiving a raw frame event signal 82 from the camera media track module 68 of the video conferencing client application 62. As mentioned above, the most recent video frame of the streaming live video is then synchronized with local live audio captured by the one or more in-vehicle microphones 52 by the audio/video synchronization module 70 before being transmitted over the network 34.

The audio/screen track module 76 of the video conferencing client application 62 receives the streaming live video captured by the one or more peripheral cameras 24, the streaming live audio captured by the camera microphone 28 that is part of the one or more peripheral cameras 24, a local live audio captured by the one or more in-vehicle microphones 52 (FIG. 1), a local live video captured by the one or more in-vehicle cameras 22, the live audio associated with the existing video conferencing session, and the live video associated with the existing video conferencing session. The audio/screen track module 76 of the video conferencing client application 62 performs real-time transport protocol (RTP) packeting on the streaming live video captured by the one or more peripheral cameras 24, the streaming live audio captured by the camera microphone 28 that is part of the one or more peripheral cameras 24, the local live audio captured by the one or more in-vehicle microphones 52, the local live video captured by the one or more in-vehicle cameras 22, the live audio associated with the existing video conferencing session, and the live video associated with the existing video conferencing session before being transmitted to the one or more media servers 36. However, before the streaming live video captured by the one or more peripheral cameras 24 and the local live audio captured by the one or more in-vehicle microphones 52 are transmitted to the one or more media servers 36, the audio/video synchronization module 70 synchronizes the streaming live video captured by the one or more peripheral cameras 24 and the local live audio captured by the one or more in-vehicle microphones 52 together as described below.

The peer-to-peer connection module 72 of the video conferencing client application 62 refers to the wireless connection between the one or more controllers 20 and the one or more media servers 36. In the event there is no media server 36 and the one or more controllers 20 connect directly with the one or more client computers 16 that are associated with other participants 18 of the existing video conferencing session, then the peer-to-peer connection module 72 refers to a direct wireless connection between the one or more controllers 20 and the one or more client computers 16.

The signaling controller 78 of the video conferencing client application 62 connects to the existing video conferencing session by identifying one or more active publishers and the corresponding media streams that are produced. The signaling controller 78 of the video conferencing client application 62 then sends a request to subscribe to the existing video conferencing session to the one or more media servers 36. In response to receiving the request, the one or more media servers 36 responds by transmitting control information to the signaling controller 78 of the video conferencing client application 62. The control information includes SDP information, where the SDP information includes information such as, but not limited to, video/audio codec, error connection mechanisms, and connection information such as the internet protocol address and port.

The SDP generator module 80 may then generate local SDP information based on the SDP information received from the one or more media servers 36 and transmits the local SDP information back to the one or more media servers 36 to establish the wireless connection between the one or more controllers 20 and the one or more media servers 36. It is to be appreciated that the SDP generator module 80 generates the local SDP information after the one or more client computers 16 associated with other participants 18 of the existing video conferencing session parse metadata associated with the streaming live video captured by the one or more peripheral cameras 24.

Figure 3:
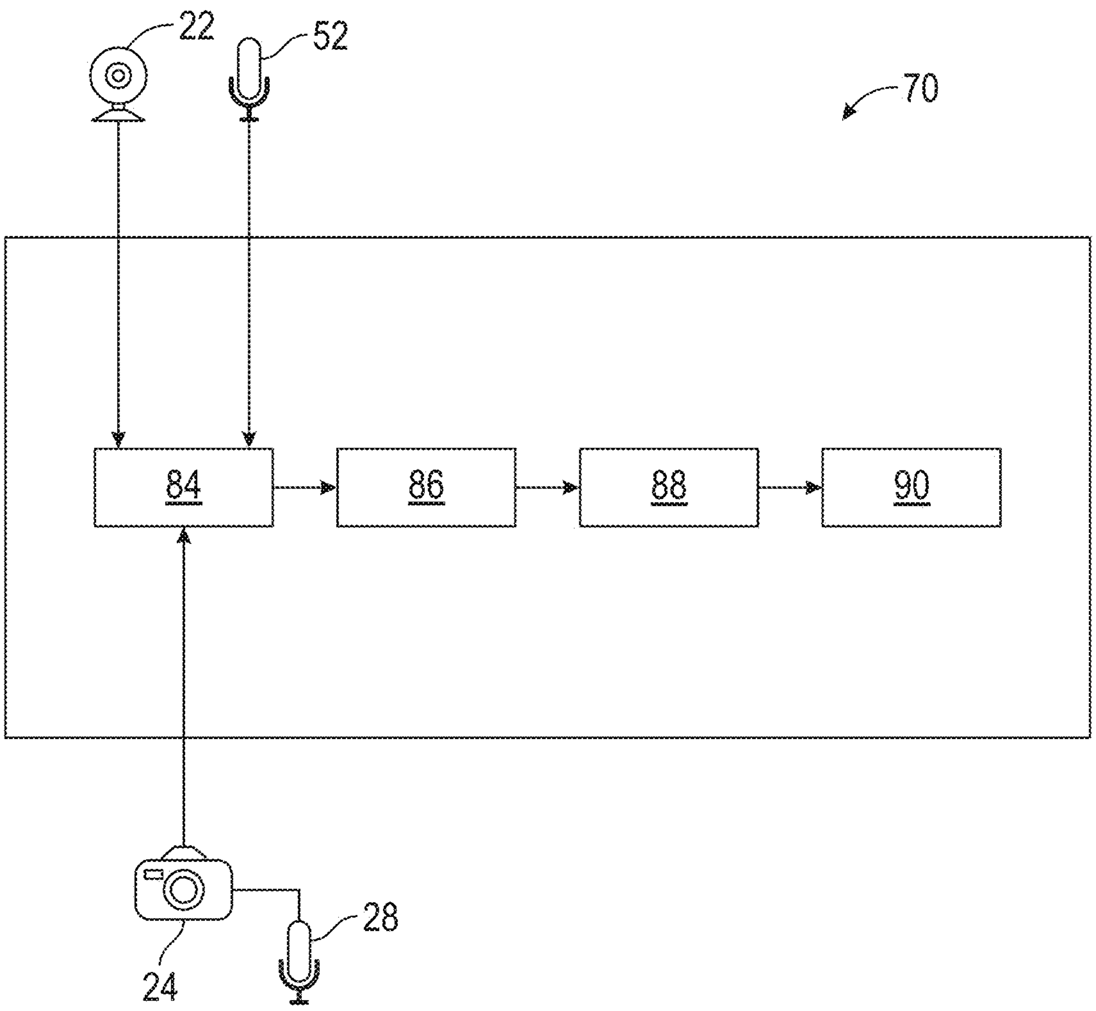
FIG. 3 is a block diagram of an audio/video synchronization module of the one or more controllers shown in FIG. 2, according to an exemplary embodiment.

FIG. 3 is a block diagram of the audio/video synchronization module 70 of the video conferencing client application 62. As mentioned above, the audio/video synchronization module 70 synchronizes the streaming live video captured by the one or more peripheral cameras 24 and the local live audio captured by the one or more in-vehicle microphones 52 together. It is to be appreciated that the one or more peripheral cameras 24 includes one or more camera processors that perform in-device synchronization between the streaming live video captured by the one or more peripheral cameras 24 and the streaming live audio captured by the camera microphone 28 first before the audio/video synchronization module 70 receives the streaming live video captured by the one or more peripheral cameras 24. Similarly, the one or more controllers 20 (FIG. 2) of the vehicle 10 also performs in-device synchronization between the local live audio captured by the one or more in-vehicle microphones 52 and the local live video captured by the one or more in-vehicle cameras 22.

The audio/video synchronization module 70 includes an audio resampling module 84, an audio normalization module 86, an audio cross-correlation module 88, and a stream packetization module 90. The audio resampling module 84 of the audio/video synchronization module 70 receives the streaming live audio captured by the camera microphone 28 and the local live audio captured by the one or more in-vehicle microphones 52. The audio resampling module 84 of the audio/video synchronization module 70 determines a sampling rate of the streaming live audio and a sampling rate of the local live audio and compares the sampling rate of the streaming live audio and the sampling rate of the local live audio. In response to determining the sampling rate of the streaming live audio and the sampling rate of the local live audio are not equal to one other, the audio resampling module 84 adjusts the sampling rate of the streaming live audio and the sampling rate of the local live audio to be equal to one another.

The audio normalization module 86 of the audio/video synchronization module 70 determines a magnitude of the streaming live audio captured by the camera microphone 28 (FIG. 1) and a magnitude of the local live audio and compares the magnitude of the streaming live audio and the magnitude of the local live audio. In response to determining the magnitude of the streaming live audio and the magnitude of the local live audio are not equal to one other, the audio resampling module 84 adjusts the magnitude of the streaming live audio and the magnitude of the local live audio to be equal to one another.

The audio cross-correlation module 88 of the audio/video synchronization module 70 determines an audio delay compensation value $\tau_1$ between the streaming live audio captured by the camera microphone 28 (FIG. 1) and the local live audio captured by the one or more in-vehicle microphones 52 (FIG. 1) of the vehicle 10. The audio delay compensation value $\tau_1$ is determined based on the following equations:

$$\text{argmax}_k R_{xy}[k] = \sum_{m=-\infty}^{\infty} x[m]y[m-k], \text{ where } \tau_1 = \frac{k}{\text{audio sampling rate}}$$

where x represents audio signals captured by the one or more in-vehicle microphones 52, y represents audio signals captured by the camera microphone 28, m and k both represent indices for the audio signals captured by the one or more in-vehicle microphones x and the audio signals captured by the camera microphone y respectively, and $R_{xy}[k]$ represents a total sum of products of a signal from the audio signals captured by the one or more in-vehicle microphones x and a signal from the audio signals captured by the camera microphone y that is k index behind (i.e., between x[k] and y[m−k]).

The audio cross-correlation module 88 of the audio/video synchronization module 70 then determines a total delay compensation value T that represents a delay between the local live audio captured by the one or more in-vehicle microphones 52 and the streaming live video captured by the one or more peripheral cameras 24 based on the audio delay compensation value $\tau_1$ and a wireless delay compensation value $\tau_0$. The wireless delay compensation value $\tau_0$ represents the delay between the streaming live video captured by the one or more peripheral cameras 24 and the streaming live audio captured by the camera microphone 28. The total delay compensation value T is the sum of the audio delay compensation value $\tau_1$ and a wireless delay compensation value $\tau_0$, or $\tau_1+\tau_0$. The audio cross-correlation module 88 then instructs the stream packetization module 90 to synchronize the streaming live video captured by the one or more peripheral cameras 24 and the local live audio captured by the one or more in-vehicle microphones 52 together based on the total delay compensation value T.

Figure 4:
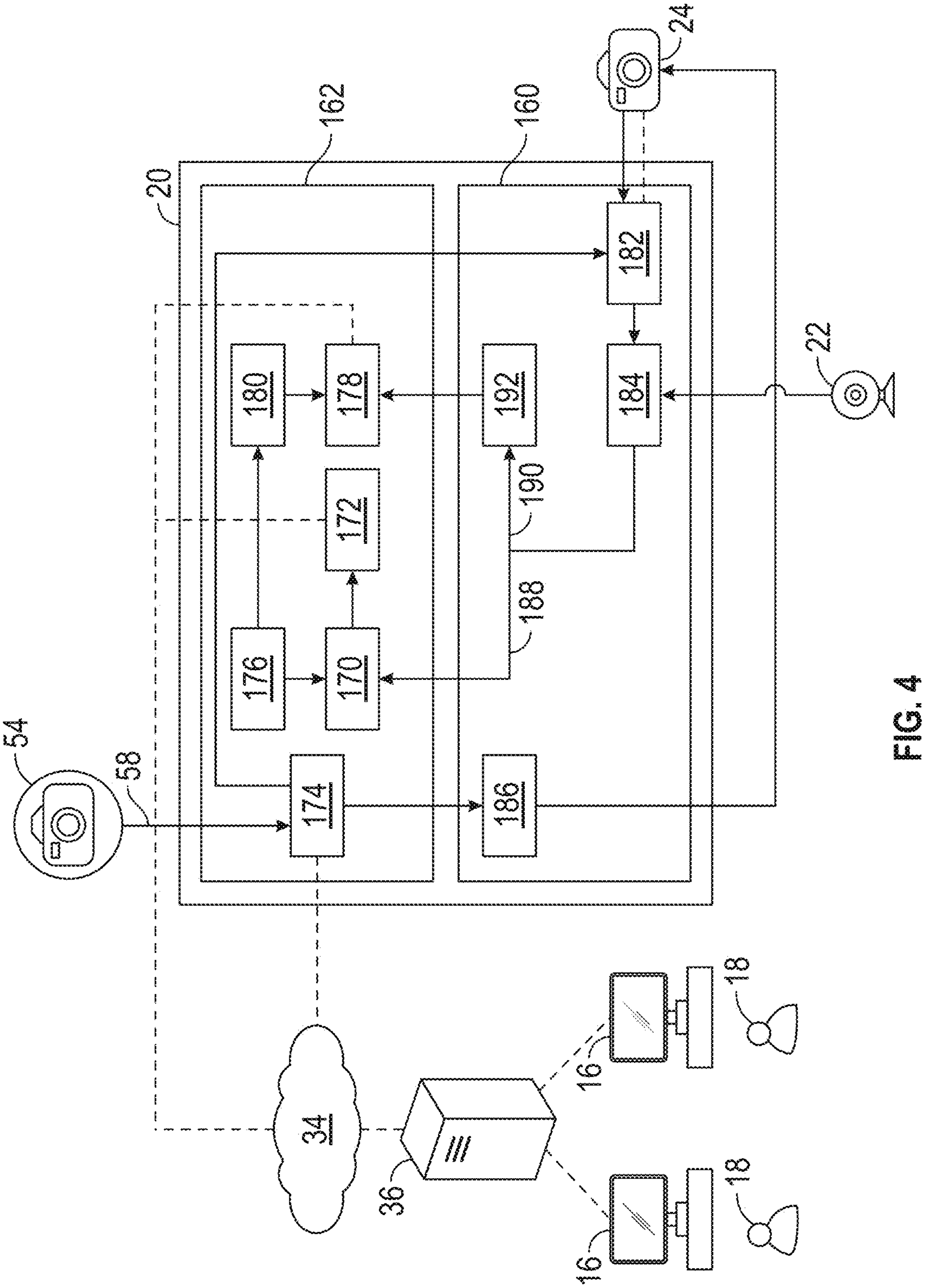
FIG. 4 is a block diagram illustrating another embodiment of the software architecture of the one or more controllers shown in FIG. 1, according to an exemplary embodiment.

FIG. 4 is a block diagram illustrating another embodiment of the software architecture of the one or more controllers 20. In the embodiment as shown in FIG. 4, the one or more controllers 20 include a camera as a service application 160 and a video conferencing client application 162. The camera as a service application 160 includes a short-range wireless communication engine 182, a video track parser 184, a quality control module 186, and a camera SDP generator 192. The video conferencing client application 162 of the one or more controllers 20 includes the audio/video synchronization module 170, the peer-to-peer connection module 172, the quality control module 174, the audio/screen track module 176, the signaling controller 178, and the SDP generator module 180. As seen in FIG. 4, the quality control module 174 of the video conferencing client application 162 is in electronic communication with and receives the camera capture signal 58 generated by the camera capture button 54.

The short-range wireless communication engine 182 of the camera as a service application 160 is in wireless communication with the one or more peripheral cameras 24 based on a short-range wireless communication protocol such as, for example, a networking protocol based on the Institute of Electrical and Electronics Engineers (IEEE) 802.15.1 standard. The short-range wireless communication engine 182 of the camera as a service application 160 is also in communication with the quality control module 174 of the video conferencing client application 162.

Unlike the embodiment as shown in FIG. 2, the camera as a service application 160 does not perform video transcoding upon the streaming live video captured by the one or more peripheral cameras 24 to adjust the one or more streaming parameters of the streaming live video to meet the one or more quality metric goals. Instead, the video transcoding is done locally by the one or more camera processors that are part of the one or more peripheral cameras 24. Specifically, the quality control module 174 of the video conferencing client application 162 receives the one or more quality metric goals from the one or more media servers 36 over the network 34. In response to receiving the camera capture signal 58 generated by the camera capture button 54, the quality control module 174 of the video conferencing client application 162 instructs the short-range wireless communication engine 182 of the camera as a service application 160 to initiate wireless communication with the one or more peripheral cameras 24 based on the short-range wireless communication protocol, and the quality control module 174 of the video conferencing client application 162 then transmits the one or more quality metric goals to the quality control module 186 of the camera as a service application 160. The quality control module 186 of the camera as a service application 160 transmits the one or more quality metric goals to the one or more camera processors of the one or more peripheral cameras 24 and instructs the one or more camera processors of the one or more peripheral cameras 24 to analyze the streaming live video captured by the one or more peripheral cameras 24 to determine the one or more quality metrics of the streaming live video.

The one or more camera processors of the one or more peripheral cameras 24 analyzes the streaming live video captured by the one or more peripheral cameras 24 to determine the one or more quality metrics of the streaming live video. The one or more camera processors of the one or more peripheral cameras 24 compares the one or more quality metrics of the streaming live video with the one or more quality metric goals. In response to the one or more camera processors of the one or more peripheral cameras 24 determining the one or more quality metrics of the streaming live video meets the one or more quality metric goals, the the video track parser 184 of the camera as a service application 160 receives the streaming live video captured by the one or more peripheral cameras 24.

In contrast, in response to determining the one or more quality metrics of the streaming live video does not meet the one or more quality metric goals, the one or more camera processors of the one or more peripheral cameras 24 performs video transcoding upon the streaming live video captured by the one or more peripheral cameras 24 to adjust one or more streaming parameters of the streaming live video to meet the one or more quality metric goals. Once the one or more quality metric goals are met, the one or more camera processors of the one or more peripheral cameras 24 transmits the streaming live video captured by the one or more peripheral cameras 24 to the video track parser 184 of the camera as a service application 160.

The video track parser 184 of the camera as a service application 160 receives the streaming live video captured by the one or more peripheral cameras 24. In addition to the streaming live video captured by the one or more peripheral cameras 24, the video track parser 184 also receives the streaming live video from the one or more in-vehicle cameras 22 as well. The video track parser 184 of the camera as a service application 160 parses the streaming live video into two components, compressed streaming live video 188 and video metadata 190. The compressed streaming live video 188 is then forwarded to the audio/video synchronization module 170 of the camera as a service application 160.

The most recent video frame of the compressed streaming live video 188 is then synchronized with local live audio captured by the one or more in-vehicle microphones 52 by the audio/video synchronization module 170. The most recent video frame of the compressed streaming live video 188 is transmitted over the network 34 to the one or more media servers 36. The one or more media servers 36 share the compressed streaming live video 188 with the one or more client computers 16 that are associated with other participants 18 of the existing video conferencing session.

The video metadata 190 is then forwarded to the camera SDP generator 192 of the of the camera as a service application 160. The camera SDP generator 192 of the camera as a service application 160 analyzes the video metadata 190 to determine one or more media characteristics of the streaming live video. Some examples of the one or more media characteristics of the streaming live video include, but are not limited to, video codecs, the presence of sub-streams, and the presence of temporal layers. Once the one or more media characteristics of the video metadata 190 are determined, the camera SDP generator 192 of the of the camera as a service application 160 determines local SDP information based on the one or more characteristics of the video metadata 190 and the SDP information received from the one or more media servers 36. The local SDP information is then transmitted back to the one or more media servers 36 to establish the wireless connection between the one or more controllers 20 and the one or more media servers 36.

Figure 5:
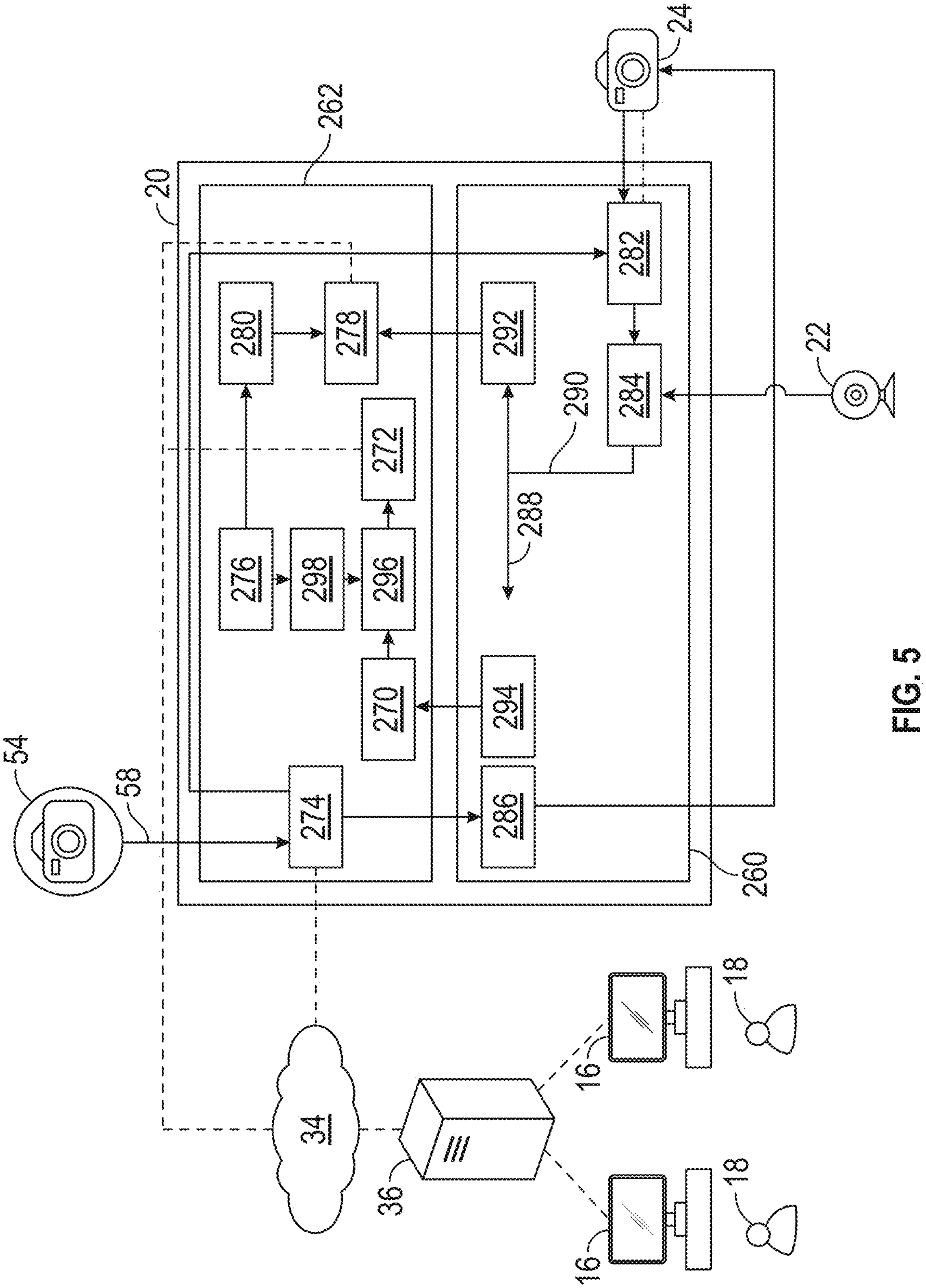
FIG. 5 is a block diagram illustrating yet another embodiment the software architecture of the one or more controllers shown in FIG. 1, according to an exemplary embodiment.

FIG. 5 is a block diagram illustrating another embodiment of the software architecture of the one or more controllers 20. In the embodiment as shown in FIG. 5, the one or more controllers 20 include a camera as a service application 260 and a video conferencing client application 262. The camera as a service application 260 includes a short-range wireless communication engine 282, a video track parser 284, a quality control module 286, a camera SDP generator 292, and an RTP packetization module 294. The video conferencing client application 262 of the one or more controllers 20 includes an audio/video synchronization module 270, a peer-to-peer connection module 272, a quality control module 274, an audio/screen track module 276, a signaling controller 278, an SDP generator module 280, an RTP mixer 296, and a client side RTP packetization module 298. As seen in FIG. 5, the quality control module 274 of the video conferencing client application 262 is in electronic communication with and receives the camera capture signal 58 generated by the camera capture button 54.

The video track parser 284 of the camera as a service application 260 parses the streaming live video received from the one or more peripheral cameras 24 into two components, the compressed streaming live video 288 and video metadata 290. Unlike the embodiment as shown in FIG. 4, the RTP packetization module 294 of the camera as a service application 260 performs RTP packetization upon the compressed streaming live video 288 prior to being transmitted to and synchronized by the audio/video synchronization module 270 of the video conferencing client application 262 of the one or more controllers 20.

The RTP packetization module 294 of the camera as a service application 260 then transmits the compressed streaming live video 288 to the RTP mixer 296 of the video conferencing client application 262 of the one or more controllers 20. The RTP mixer 296 mixes the compressed streaming live video 288 with the streaming live audio captured by the camera microphone 28 that is part of the one or more peripheral cameras 24, the local live audio captured by the one or more in-vehicle microphones 52 (FIG. 1), and the local live video captured by the one or more in-vehicle cameras 22. It is to be appreciated that the RTP mixer 296 of the video conferencing client application 262 revises the canonical name associated with the one or more peripheral cameras 24 that captures the compressed streaming live video 288 to match a canonical name associated with the one or more in-vehicle cameras 22. In other words, the RTP mixer 296 of the video conferencing client application 262 changes the canonical name associated with the device that captures the streaming live video that is captured by an external device (i.e., the one or more peripheral cameras 24) to match the canonical name of the local device associated with the existing local video that is captured by the in-vehicle camera 22. It is to be appreciated that the canonical name does not need to be revised for the embodiments as shown in FIGS. 2 and 4 because RTP packetization is performed by the video conferencing client application 262 of the one or more controllers 20, while the embodiment shown in FIG. 5 performs RTP packetization by the RTP packetization module 294 of the camera as a service application 260.

Referring generally to the figures, the disclosed vehicle streaming system provides various technical effects and benefits. Specifically, the disclosed vehicle streaming system provides an approach to seamlessly integrate streaming live video captured by one or more stand-alone peripheral cameras with local live audio captured by one or more in-vehicle microphones. Furthermore, the disclosed vehicle streaming system also provides a camera virtualization mechanism that revises the canonical name associated with the streaming live video to match the local or in-vehicle devices. Accordingly, other participants who are part of an existing video conferencing session are not aware that the vehicle occupants are employing a peripheral camera to capture the streaming live video.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle streaming system including one or more peripheral cameras that capture streaming live video that is transmitted over a network to one or more media servers, the vehicle streaming system comprising:

one or more controllers in wireless communication with the one or more peripheral cameras and one or more media servers by the network, wherein the one or more controllers each include one or more processors that execute instructions to:

determine the one or more peripheral cameras are actively capturing live video during an existing video conferencing session;

receive a camera capture signal indicative of an occupant of the vehicle attempting to share the streaming live video captured by the one or more peripheral cameras during the existing video conferencing session;

in response to determining the one or more peripheral cameras are actively capturing live video and receiving the camera capture signal, analyze the streaming live video captured by the one or more peripheral cameras to determine one or more quality metrics of the streaming live video;

compare the one or more quality metrics of the streaming live video with one or more quality metric goals determined by the one or more media servers;

in response to determining the one or more quality metrics of the streaming live video meets the one or more quality metric goals, decode the streaming live video;

in response to determining the one or more quality metrics of the streaming live video does not meet the one or more quality metric goals, perform video transcoding upon the streaming live video captured by the one or more peripheral cameras to adjust one or more streaming parameters of the streaming live video to meet the one or more quality metric goals, wherein the one or more streaming parameters of the streaming live video include one or more of the following: resolution, frame rate, a number of sub-streams, a number of temporal layers, and a determination when scalable video coding techniques are activated; and in response to receiving a raw frame event signal, select a most recent video frame of the streaming live video for transmittal over the network to the one or more media servers, wherein the one or more media servers share the streaming live video with one or more client computers associated with other participants of the existing video conferencing session.

2. The vehicle streaming system of claim 1, wherein the one or more controllers execute instructions to:

synchronize a most recent video frame of the streaming live video with local live audio captured by one or more in-vehicle microphones.

3. The vehicle streaming system of claim 2, wherein synchronizing the most recent video frame of the streaming live video with local live audio captured by one or more in-vehicle microphones includes:

determining an audio delay compensation value between a streaming live audio captured by a camera microphone and the local live audio captured by the one or more in-vehicle microphones of the vehicle.

4. The vehicle streaming system of claim 3, wherein the audio delay compensation value is determined by:

$$\text{argmax}_k R_{xy}[k] = \sum_{m=-\infty}^{\infty} x[m]y[m-k], \text{ where } \tau_1 = \frac{k}{\text{audio sampling rate}}$$

wherein $\tau_1$ represents the audio delay compensation value, x represents audio signals captured by the one or more in-vehicle microphones, y represents audio signals captured by the camera microphone, m and k both represent indices for the audio signals x captured by the one or more in-vehicle microphones and the audio signals y captured by the camera microphone, and $R_{xy}[k]$ represents a total sum of products of a signal from the audio signals captured by the one or more in-vehicle microphones x and a signal from the audio signals captured by the camera microphone y that is k index behind.

5. The vehicle streaming system of claim 3, wherein synchronizing the most recent video frame of the streaming live video with local live audio captured by one or more in-vehicle microphones includes:

determining a total delay compensation value that represents a delay between the local live audio captured by the one or more in-vehicle microphones and the streaming live video captured by the one or more peripheral cameras based on the audio delay compensation value and a wireless delay compensation value; and synchronizing the streaming live video captured by the one or more peripheral camera and the local live audio captured by the one or more in-vehicle microphones together based on the total delay compensation value.

6. The vehicle streaming system of claim 5, wherein the wireless delay compensation value represents a delay between the streaming live video captured by the one or more peripheral cameras and the streaming live audio captured by the camera microphone.

7. The vehicle streaming system of claim 5, wherein the total delay compensation value is the sum of the audio delay compensation value and the wireless delay compensation value.

8. The vehicle streaming system of claim 1, wherein the one or more quality metrics of the streaming live video include one or more of the following: bitrate, resolution, and frame rate.

9. The vehicle streaming system of claim 1, wherein the one or more quality metric goals are based on a media data rate required by the one or more media servers for the existing video conferencing session.

10. The vehicle streaming system of claim 1, wherein the raw frame event signal is indicative of the one or more client computers generating a request for the streaming live video.

11. A vehicle streaming system including one or more in-vehicle microphones and one or more peripheral cameras that capture streaming live video that is transmitted over a network to one or more media servers, the vehicle streaming system comprising:

one or more controllers in wireless communication with the one or more peripheral cameras and one or more media servers by the network, wherein the one or more controllers each include one or more processors that execute instructions to:

determine the one or more peripheral cameras are actively capturing live video during an existing video conferencing session;

receive a camera capture signal indicative of an occupant of the vehicle attempting to share the streaming live video captured by the one or more peripheral cameras during the existing video conferencing session;

in response to determining the one or more peripheral cameras are actively capturing live video and receiving the camera capture signal, analyze the streaming live video captured by the one or more peripheral cameras to determine one or more quality metrics of the streaming live video;

compare the one or more quality metrics of the streaming live video with one or more quality metric goals determined by the one or more media servers;

in response to determining the one or more quality metrics of the streaming live video meets the one or more quality metric goals, decode the streaming live video;

synchronize a most recent video frame of the streaming live video with local live audio captured by the one or more in-vehicle microphones; and in response to receiving a raw frame event signal, select a most recent video frame of the streaming live video for transmittal over the network to the one or more media servers, wherein the one or more media servers share the streaming live video with one or more client computers associated with other participants of the existing video conferencing session.

12. The vehicle streaming system of claim 11, wherein synchronizing the most recent video frame of the streaming live video with local live audio captured by one or more in-vehicle microphones includes:

determining an audio delay compensation value between a streaming live audio captured by a camera microphone and the local live audio captured by the one or more in-vehicle microphones of the vehicle.

13. The vehicle streaming system of claim 12, wherein the audio delay compensation value is determined by:

$$\operatorname{argmax}_k R_{xy}[k] = \sum_{m=-\infty}^{\infty} x[m]y[m-k], \text{ where } \tau_1 = \frac{k}{\text{audio sampling rate}}$$

wherein $\tau_1$ represents the audio delay compensation value, x represents audio signals captured by the one or more in-vehicle microphones, y represents audio signals captured by the camera microphone, m and k both represent indices for the audio signals x captured by the one or more in-vehicle microphones and the audio signals y captured by the camera microphone, and $R_{xy}[k]$ represents a total sum of products of a signal from the audio signals captured by the one or more in-vehicle microphones x and a signal from the audio signals captured by the camera microphone y that is k index behind.

14. The vehicle streaming system of claim 12, wherein synchronizing the most recent video frame of the streaming live video with local live audio captured by one or more in-vehicle microphones includes:

determining a total delay compensation value that represents a delay between the local live audio captured by the one or more in-vehicle microphones and the streaming live video captured by the one or more peripheral cameras based on the audio delay compensation value and a wireless delay compensation value; and synchronizing the streaming live video captured by the one or more peripheral camera and the local live audio captured by the one or more in-vehicle microphones together based on the total delay compensation value.

15. The vehicle streaming system of claim 14, wherein the wireless delay compensation value represents a delay between the streaming live video captured by the one or more peripheral cameras and the streaming live audio captured by the camera microphone.

16. The vehicle streaming system of claim 14, wherein the total delay compensation value is the sum of the audio delay compensation value and the wireless delay compensation value.

17. The vehicle streaming system of claim 11, wherein the one or more quality metrics of the streaming live video include one or more of the following: bitrate, resolution, and frame rate.

18. A vehicle streaming system, comprising:

one or more in-vehicle microphones;

one or more peripheral cameras that capture streaming live video that is transmitted over a network to one or more media servers;

one or more controllers in wireless communication with one or more peripheral cameras and one or more media servers by the network, wherein the one or more controllers each include one or more processors that execute instructions to:

determine the one or more peripheral cameras are actively capturing live video during an existing video conferencing session;

receive a camera capture signal indicative of an occupant of the vehicle attempting to share the streaming live video captured by the one or more peripheral cameras during the existing video conferencing session;

in response to determining the one or more peripheral cameras are actively capturing live video and receiving the camera capture signal, analyze the streaming live video captured by the one or more peripheral cameras to determine one or more quality metrics of the streaming live video;

compare the one or more quality metrics of the streaming live video with one or more quality metric goals determined by the one or more media servers;

in response to determining the one or more quality metrics of the streaming live video meets the one or more quality metric goals, decode the streaming live video;

synchronize a most recent video frame of the streaming live video with local live audio captured by the one or more in-vehicle microphones, wherein synchronizing the most recent video frame of the streaming live video with local live audio captured by one or more in-vehicle microphones includes:

determining an audio delay compensation value between a streaming live audio captured by a camera microphone and the local live audio captured by the one or more in-vehicle microphones of the vehicle; and in response to receiving a raw frame event signal, select a most recent video frame of the streaming live video for transmittal over the network to the one or more media servers, wherein the one or more media servers share the streaming live video with one or more client computers associated with other participants of the existing video conferencing session.

19. The vehicle streaming system of claim 18, wherein the one or more controllers execute instructions to:

in response to determining the one or more quality metrics of the streaming live video does not meet the one or more quality metric goals, perform video transcoding upon the streaming live video captured by the one or more peripheral cameras to adjust one or more streaming parameters of the streaming live video to meet the one or more quality metric goals.

20. The vehicle streaming system of claim 19, wherein the one or more streaming parameters of the streaming live video include one or more of the following: resolution, frame rate, a number of sub-streams, a number of temporal layers, and a determination when scalable video coding techniques are activated.

* * * * *